(12) United States Patent
Hotary et al.

(10) Patent No.: US 6,773,050 B1
(45) Date of Patent: Aug. 10, 2004

(54) SPACE EFFICIENT AND ADAPTABLE VEHICLE INTERIOR

(75) Inventors: James T. Hotary, Holland, MI (US); David B. Busch, Holland, MI (US); Michael E. Wiedeman, Manhattan Beech, CA (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 10/030,588

(22) PCT Filed: Jul. 7, 2000

(86) PCT No.: PCT/US00/18821
§ 371 (c)(1),
(2), (4) Date: May 17, 2002

(87) PCT Pub. No.: WO01/02213
PCT Pub. Date: Jan. 11, 2001

Related U.S. Application Data
(60) Provisional application No. 60/142,711, filed on Jul. 7, 1999.

(51) Int. Cl.⁷ .................................................. B60N 2/02
(52) U.S. Cl. ...................... 296/64; 296/65.01; 297/340; 297/531; 297/236; 297/239
(58) Field of Search ................................ 296/64, 65.01, 296/65.05, 65.08, 65.13, 65.15; 297/340, 344.1, 331, 334, 335, 344.5, 316, 234, 236, 239

(56) References Cited

U.S. PATENT DOCUMENTS

| | | | | |
|---|---|---|---|---|
| 474,097 A | * | 5/1892 | McPartland | 297/236 |
| 500,354 A | * | 6/1893 | Sparks | 297/236 |
| 1,211,108 A | * | 1/1917 | Douglas | 297/183.5 |
| 1,305,407 A | * | 6/1919 | Prouty | 297/236 |
| 1,320,854 A | * | 11/1919 | Hammers | 297/236 |
| 1,321,009 A | * | 11/1919 | Carlson | 297/236 |
| 3,236,556 A | * | 2/1966 | Lathers | |
| 4,986,591 A | * | 1/1991 | Martienssen et al. | 296/65.1 |
| 5,492,386 A | * | 2/1996 | Callum | 296/64 |
| 5,732,923 A | * | 3/1998 | Tame | 297/216.18 |
| 5,765,894 A | * | 6/1998 | Okazaki et al. | 296/65.03 |
| 5,800,015 A | * | 9/1998 | Tsuchiya et al. | 297/331 |
| 5,954,390 A | * | 9/1999 | Kleinhoffer et al. | 296/203.01 |
| 6,523,899 B1 | * | 2/2003 | Tame | 297/331 |
| 6,648,392 B2 | * | 11/2003 | Fourrey et al. | 296/65.09 |
| 2001/0050501 A1 | * | 12/2001 | Fourrey et al. | 297/331 |

FOREIGN PATENT DOCUMENTS

| | | | | |
|---|---|---|---|---|
| JP | 59-164234 | * | 9/1984 | 297/344.1 |
| JP | 5-69765 | * | 3/1993 | 297/344.1 |
| JP | 11-321409 | * | 11/1999 | |
| JP | 11-321410 | * | 11/1999 | |
| JP | 2000-185581 | * | 7/2000 | |

* cited by examiner

*Primary Examiner*—D. Glenn Dayoan
*Assistant Examiner*—H. Gutman
(74) *Attorney, Agent, or Firm*—Foley & Lardner LLP

(57) ABSTRACT

A front seat assembly (54) and a rear seat assembly (10) for a vehicle, including a front seat bottom (52) having a front portion and a rear portion, a rear seat bottom (14) having a forward portion and a rearward portion and being connectable to the vehicle for movement between a use position and a stored position, and a support member (82) connected to the front seat bottom and connectable to the vehicle. The support member supports the rear portion of the front seat bottom from the vehicle such that the rear seat bottom may be moved from the use position to the stored position with the forward potion of the rear seat bottom located under the front seat bottom.

21 Claims, 8 Drawing Sheets

SPACE EFFICIENT AND ADAPTABLE VEHICLE INTERIOR

This application claims the benefit of provisional application No. 60/142,711, filed Jul. 7, 1999.

TECHNICAL FIELD OF THE INVENTION

This invention generally relates to seating assemblies for a vehicle and, more particularly, to a front seat assembly and a rear seat assembly which, when used individually or in combination, provide a highly adaptable vehicle interior.

BACKGROUND OF THE INVENTION

With an ever increasing pressure from automotive consumers, flexibility and adaptability of vehicle interiors is increasingly required in order to provide a vehicle adapted to meet the broad consumer demand. Further, with increased social awareness of a vehicle's impact on the environment, there is an increasing demand to minimize the overall mass of the vehicle while still meeting the feature requirements of the consumer. One of these demands of the consumer is the ability of the vehicle to carry four passengers during some situations and to maximize cargo room during other situations. Some attempts to meet this demand have included the use of folding rear seat assemblies. These attempts, however, can only provide limited cargo room. For example, French Patent No. 2,572,340 ("Renault") shows a rear seat assembly that is adapted for nesting behind a front seat assembly by sliding, non-articulating, movement along an inclined track which tends to limit the available cargo space due to the raised track portion.

SUMMARY OF THE INVENTION

Accordingly, this invention provides for a front seat assembly and a rear seat assembly, which overcome the problems and disadvantages of the conventional techniques in the art. The invention also provides for a front seat assembly and a rear seat assembly that allows the rear seat assembly to articulate forward and downward and to be stored below and behind the front seat assembly. The invention also provides for a front seat assembly that increases leg and foot room for the occupants of the rear seat assembly.

In one aspect, the invention includes a front seat assembly for a vehicle having a rear seat assembly with a rear seat bottom, including a front seat bottom having a front portion and a rear portion and a support member connected to the front seat bottom and connectable to the vehicle. The support member supports the rear portion of the front seat bottom from the vehicle such that the rear seat bottom may be moved from a use position to a stored position with a forward portion of the rear seat bottom located under the front seat bottom.

In another aspect, the invention includes a rear seat assembly for a vehicle having a front seat assembly with a front seat bottom and a front seat back, including a rear seat bottom having a forward portion and a rearward portion and being connectable to the vehicle for movement between a use position and a stored position. When the rear seat bottom is moved from the use position to the stored position, the forward portion of the rear seat bottom is located under the front seat bottom.

In a further aspect, the invention includes a front seat assembly and a rear seat assembly for a vehicle, including a front seat bottom having a front portion and a rear portion, a rear seat bottom having a forward portion and a rearward portion and being connectable to the vehicle for movement between a use position and a stored position, and a support member connected to the front seat bottom and connectable to the vehicle. The support member supports the rear portion of the front seat bottom from the vehicle such that the rear seat bottom may be moved from the use position to the stored position with the forward portion of the rear seat bottom located under the front seat bottom.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments is merely exemplary in nature and is no way intended to limit the invention, or its application, or uses.

Figure 1:
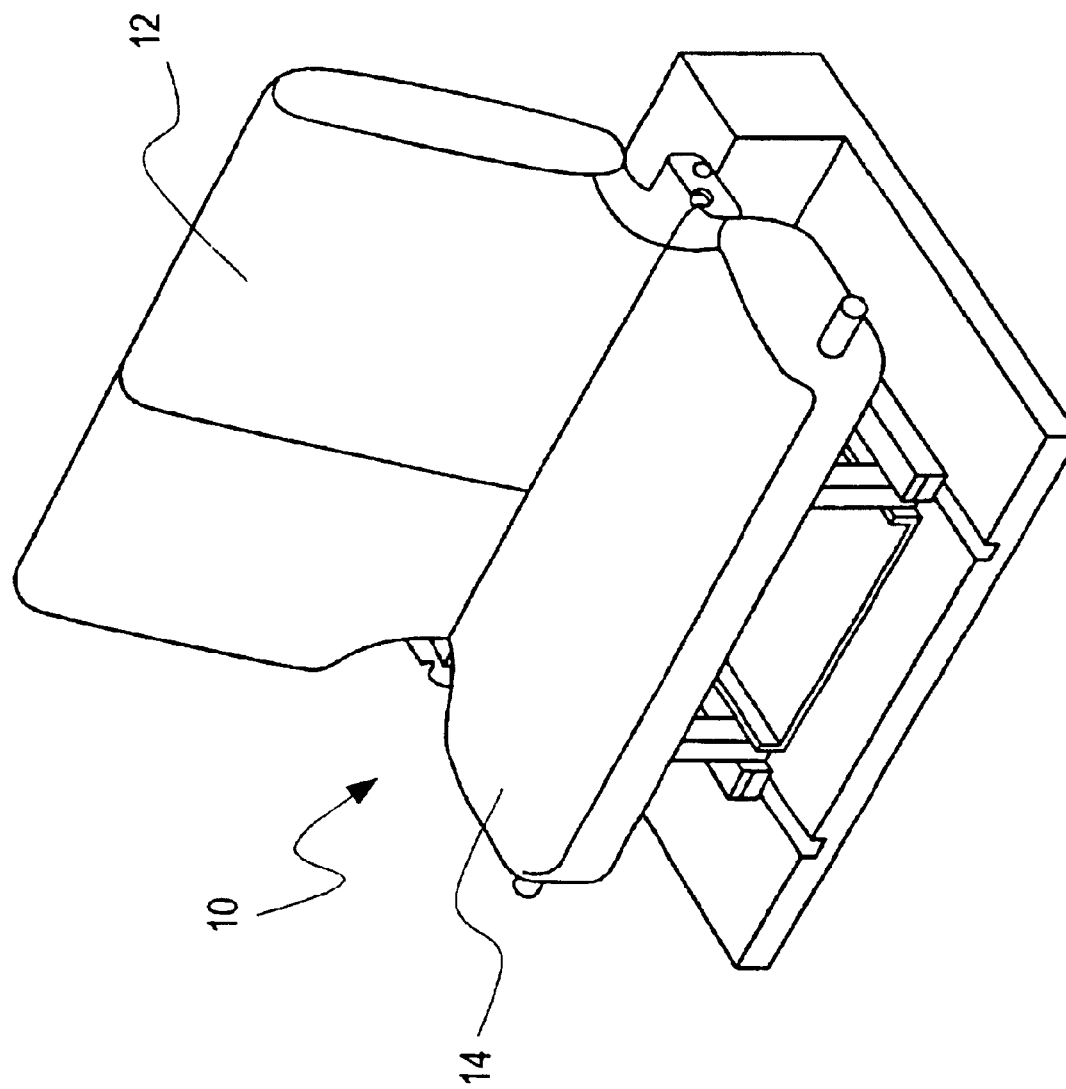
FIG. 1 is a perspective view of the rear seat assembly, according to the preferred embodiment of the invention.

As shown in FIG. 1, a rear seat assembly 10 is shown which in the preferred embodiment incorporates a 60/40 split rear seat back 12. Preferably, either or both portions of the rear seat back 12 are pivotally attached to the rear seat bottom 14 of the rear seat assembly 10. Alternatively, the rear seat back 12 can be secured at a fixed angle relative to the rear seat bottom 14.

Figure 2:
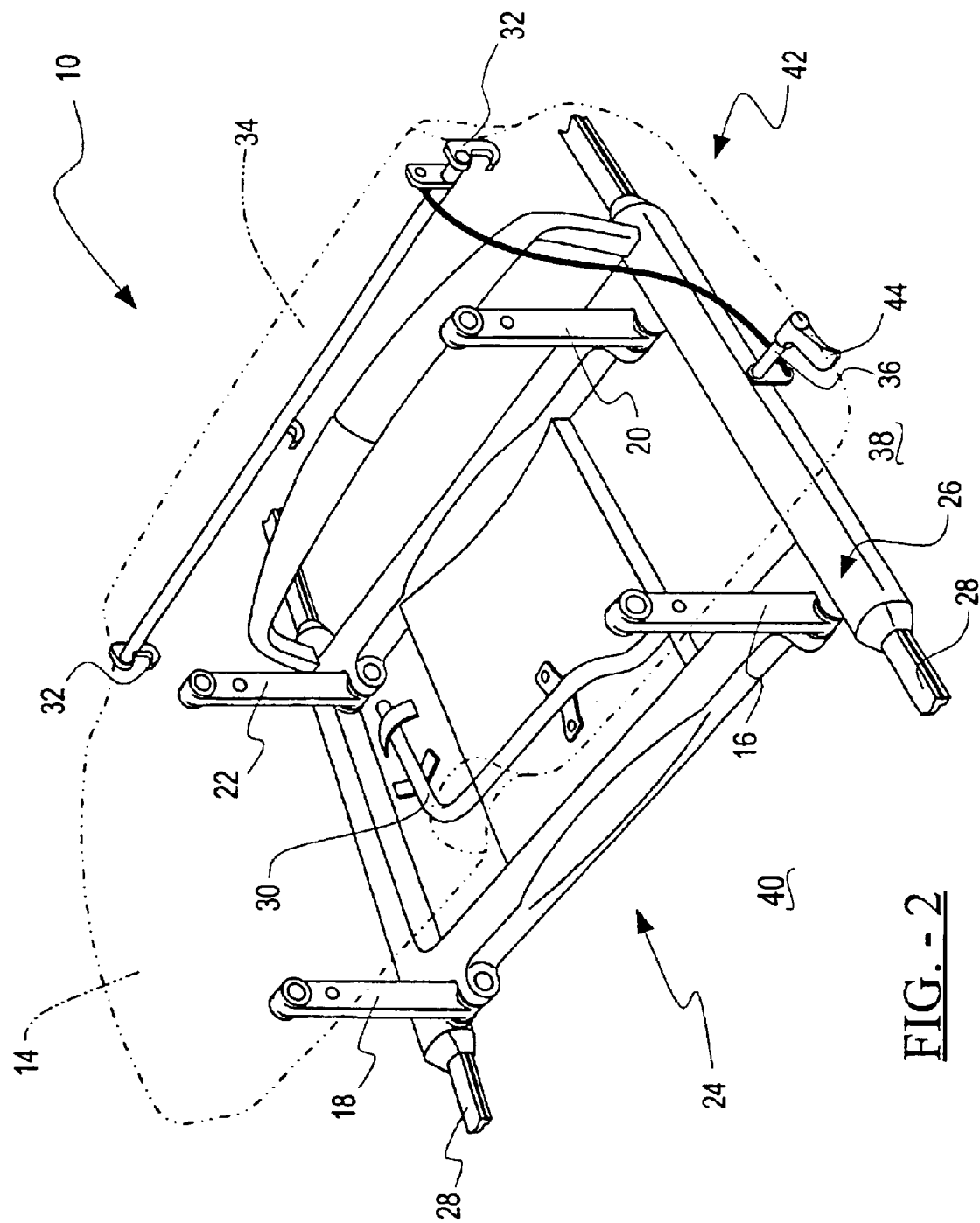
FIG. 2 is a perspective view of the biasing device, articulation mechanism, and the slide mechanism, according to the preferred embodiment of the invention.

As shown in FIG. 2, the rear seat bottom 14 of the rear seat assembly 10 is preferably pivotally attached to a proximal end of four lift arms 16, 18, 20, 22 of an articulation mechanism 24 which are subsequently pivotally attached at their distal ends to a slide mechanism 26. The slide mechanism 26 preferably engages seat guides 28 which generally traverse fore and aft in the vehicle 40 and allow the slide mechanism 26 to be adjusted fore and aft in the vehicle 40 as described later. In the preferred embodiment, a torsion spring 30 is coupled between the structure of the rear seat bottom 14 and one or more of the lift arms 16, 18, 20, 22 to provide assistance in raising the rear seat assembly 10 from a stored position to a use position. Further, in the preferred embodiment, latch mechanisms 32 are provided near a rearward portion 34 of the rear seat bottom 14 and engage complementary strikers 36 secured to the floor 38 of the vehicle 40. The latch and striker combination 42 secures the rear seat bottom 14 in the use position for occupant seating.

Figure 3C:
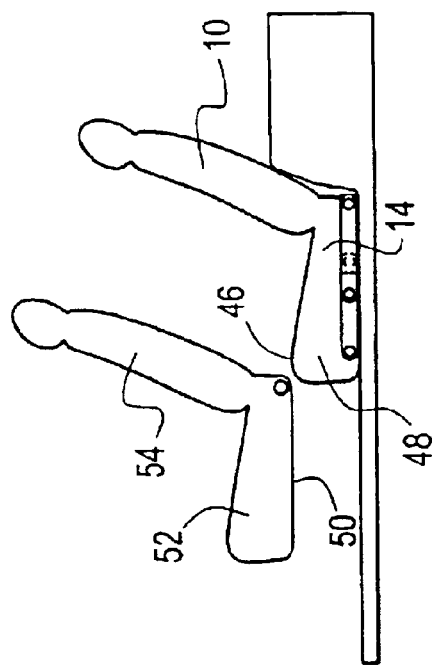
FIGS. 3a–3d are side views of the front seat assembly and the rear seat assembly, according to a preferred embodiment of the invention.
Figure 3D:
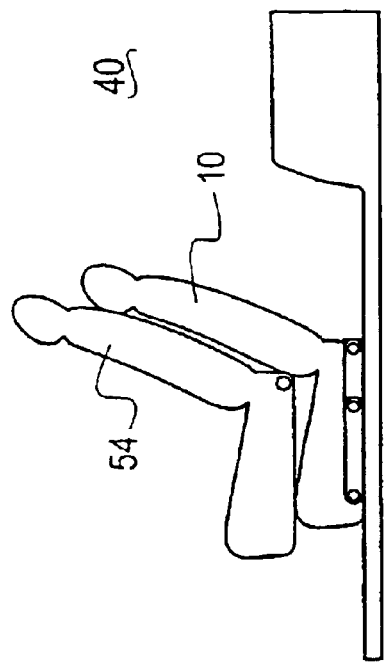
Figure 3A:
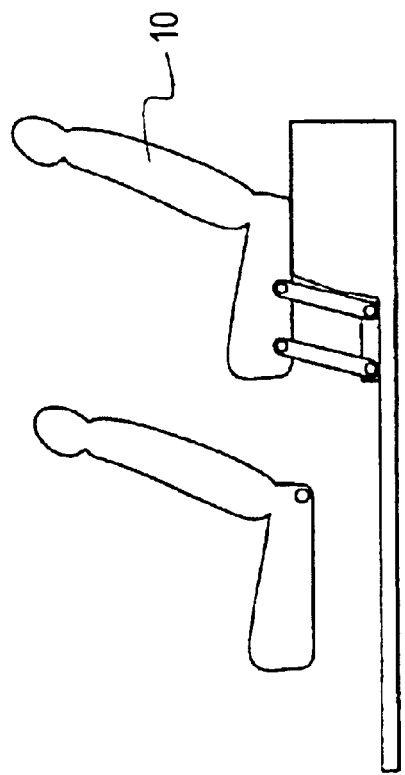
Figure 3B:
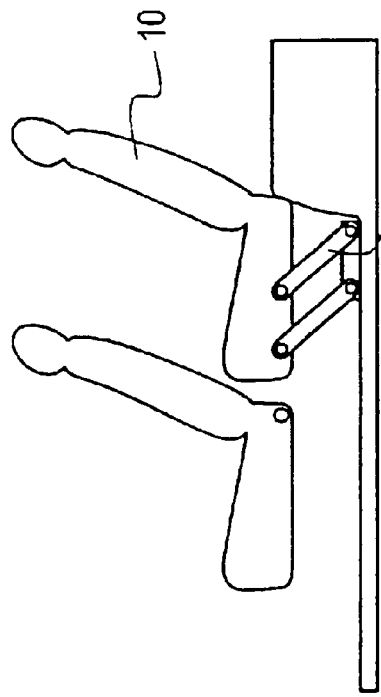

When the vehicle 40 user wishes to increase the cargo carrying capacity and store the rear seat assembly 10, the latch and striker combination 42 is preferably released by actuating the riser handle 44. The rear seat assembly 10 is then moved forward from the use position, as shown in FIG. 3a, to the first intermediate position, as shown in FIG. 3b. Once the rear seat assembly 10 has been moved forward beyond the centerline of the articulation mechanism 24, the rear seat assembly 10 will naturally progress toward the second intermediate position, as shown in FIG. 3c. The top surface 46 of the forward portion 48 of the rear seat bottom 14 is located below the lower surface 50 of the front seat bottom 52 of the front seat assembly 54. With the rear seat assembly 10 in the second intermediate position, the riser release handle is preferably exposed and upon articulation translates the rear seat assembly 10 forward along the seat guides by means of the slide mechanism. In the stored position, as shown in FIG. 3d, the rear seat assembly 10 is nested or spoons against the front seat assembly 54 in a compact space efficient fashion thereby allowing increased cargo carrying capacity within the vehicle 40.

Figure 4:
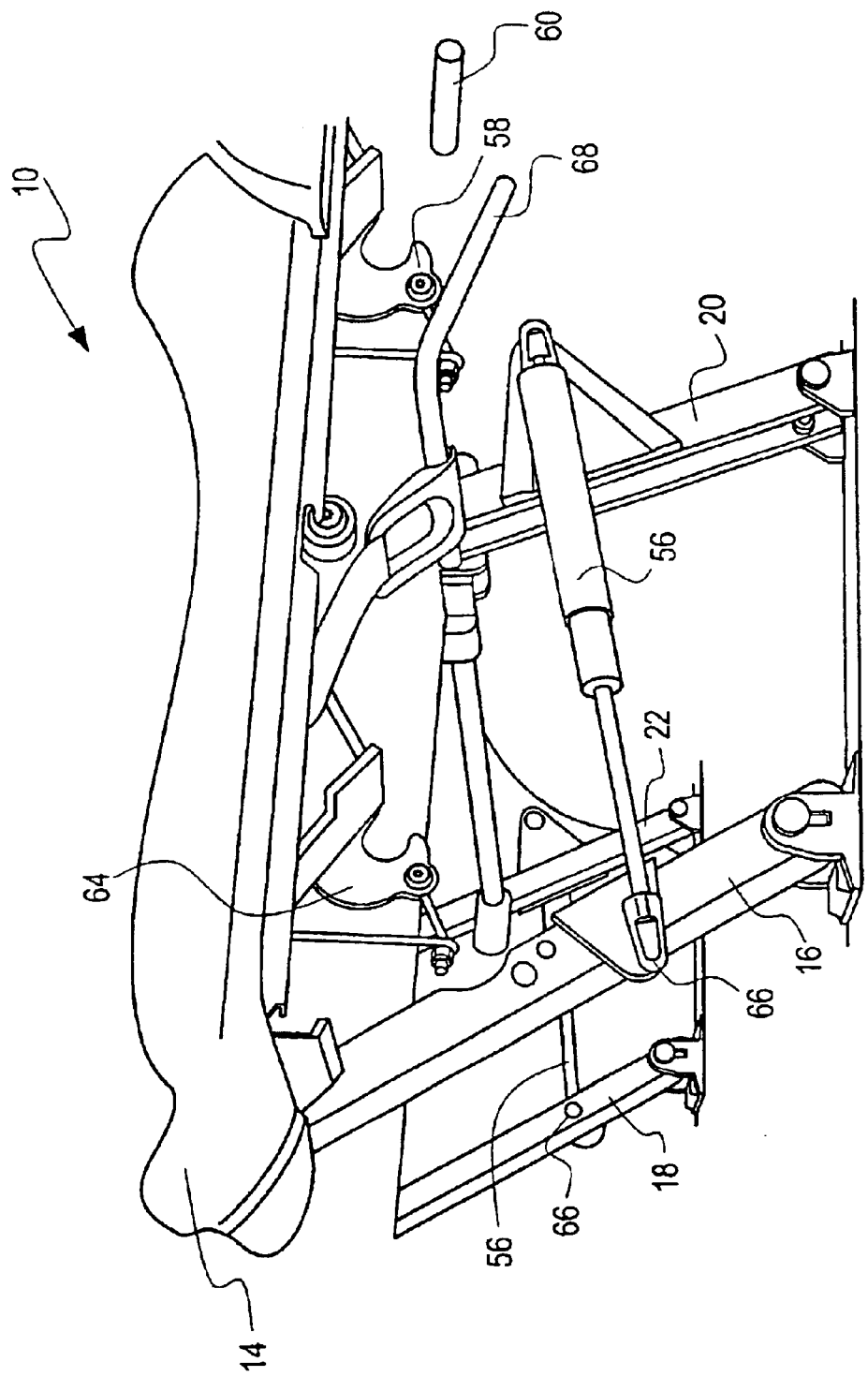
FIG. 4 is a perspective view of the biasing device and the articulation mechanism, according to an alternative embodiment of the invention.

As shown in FIG. 4, the rear seat assembly 10 of an alternative embodiment preferably includes two axial springs 56 connected to the forward lift arms 16, 18 and to the rearward lift arms 20, 22. The axial spring 56 preferably functions to bias the rear seat bottom 14 from the use position to the first intermediate position. The axial spring 56 also preferably functions to bias the rear seat bottom 14 from the second intermediate position to the first intermediate position. In this manner, the axial spring 56 acts like an over-center spring. In further alternative embodiments, the axial spring 56 may function to bias the rear seat bottom 14 from the use position to the second intermediate position. The torsion spring 30 (of FIG. 2) and the axial spring 56, collectively referenced as a "biasing device", function to aid the vehicle occupant in the movement of the rear seat assembly 10. Other suitable devices, such as levers or gears, may also be used to aid the vehicle occupant.

As also shown in FIG. 4, the rear seat assembly 10 of an alternative embodiment preferably includes a first latching device 58 connected to the rear seat bottom 14, and selectively engageable with a first striker 60 connected with the vehicle 40 to hold the rear seat bottom 14 in the use position. Further, the alternative embodiment preferably includes a second latching device 64 connected to the rear seat bottom 14 and selectively engageable with a second striker 66 connected to the forward lift arms 16, 18 to hold the rear seat bottom 14 among the second intermediate position and the stored position. The first latching device 58 and the second latching device 64 may be used separately or in combination. When used in combination, a first release handle 68 is preferably connected to the first latching device 58 and the second latching device 64 to simultaneously actuate the first latching device 58 and the second latching device 64.

Figure 5:
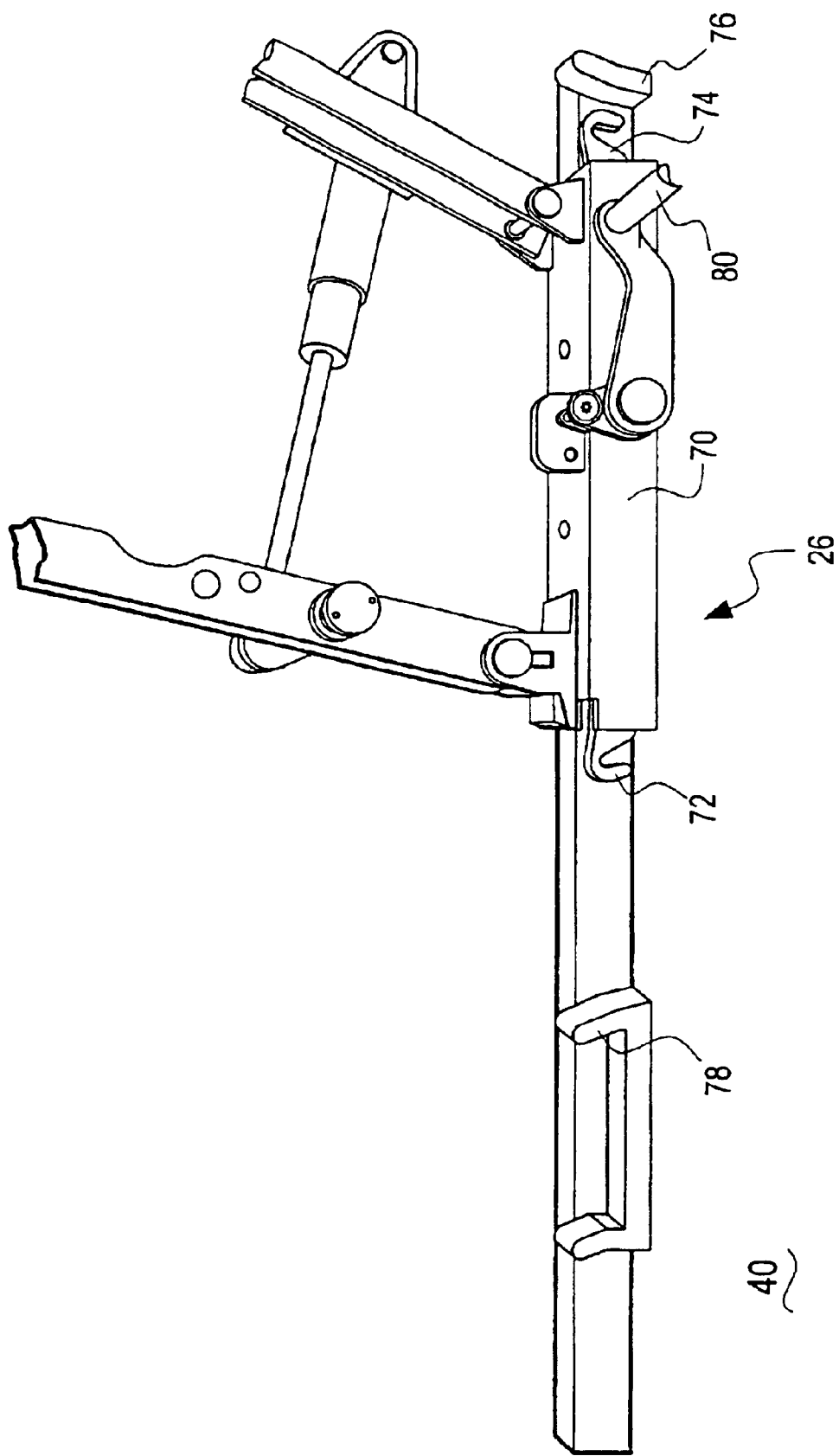
FIG. 5 is a perspective view of the slide mechanism, according to an alternative embodiment of the invention.

As shown in FIG. 5, the slide mechanism 26 of an alternative embodiment preferably includes a third latching device 70 having a first hook 72 extending in a forward direction and a second hook 74 extending in a rearward direction. The first hook 72 is selectively engageable with a third striker 78 connected to the vehicle 40 to hold the rear seat bottom in the stored position, while the second hook 74 is selectively engageable with a fourth striker 76 connected to the vehicle 40 to hold the rear seat bottom among the second intermediate position, the first intermediate position, and the use position. The third latching device 70 preferably includes a second release handle 80 that simultaneously actuates the first hook 72 and the second hook 74.

Figure 6:
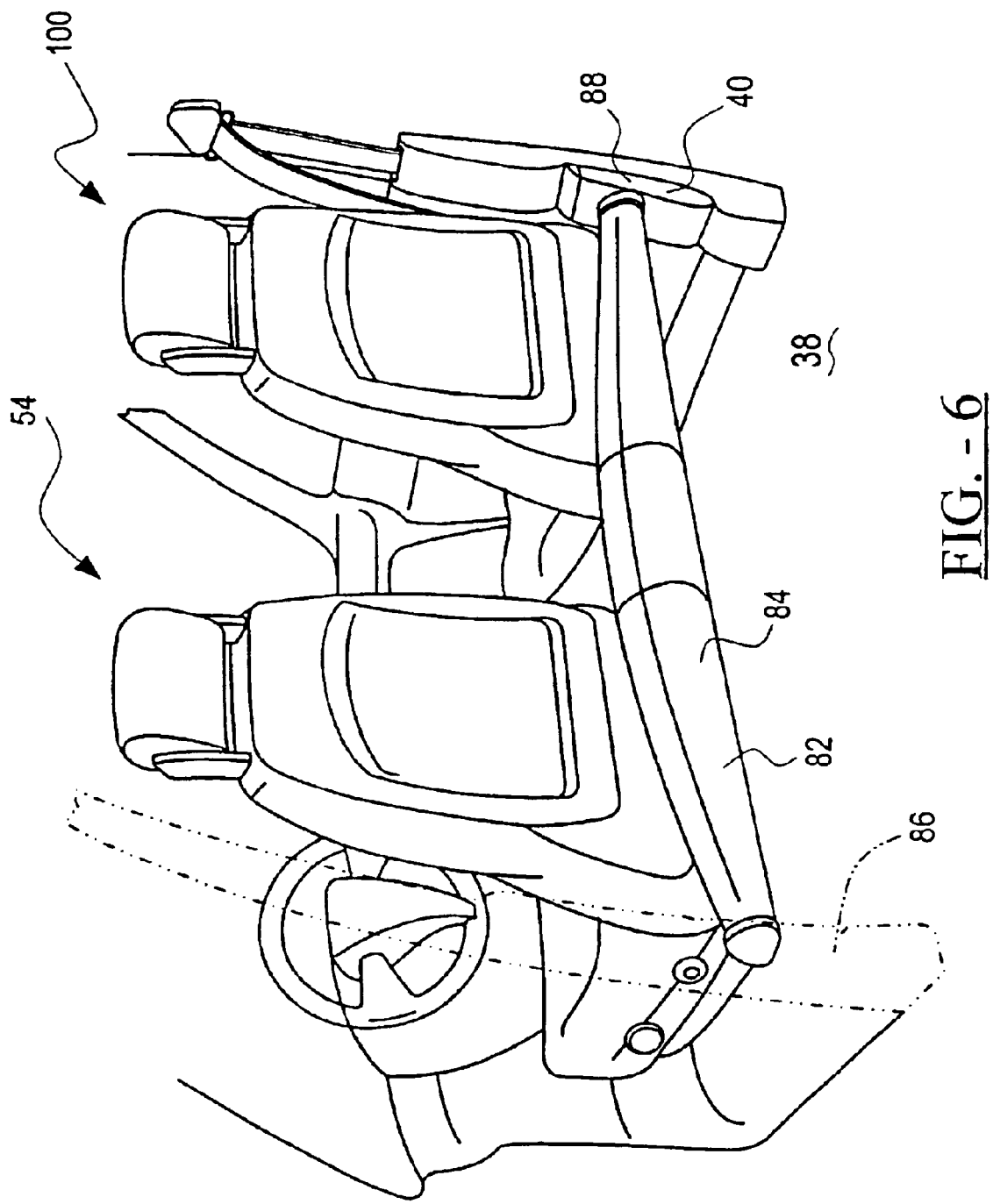
FIG. 6 is a perspective view of the front seat assembly, according to the preferred embodiment of the invention.
Figure 7:
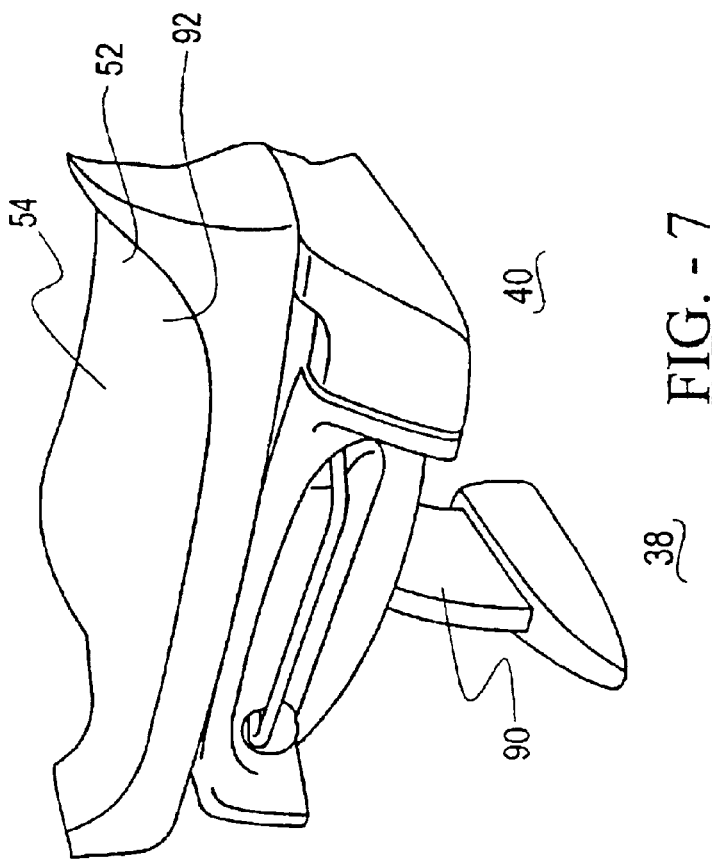
FIG. 7 is a perspective view of the front riser, according to the preferred embodiment of the invention.

In order to enable the rear seat assembly to be stored in the fashion described above, the front seat assembly necessarily provides clearance for the rear seat bottom to move underneath the front seat bottom. As shown in FIG. 6, a support member 82 is provided for the front seat assembly 54 in the form of a cross-car beam 84. In the preferred embodiment, the cross-car beam 84 is connected to the structure of the vehicle 40 at a height above the floor 38 of the vehicle 40 sufficient to allow the rear seat bottom to slide below the support member 82. Further, the cross-car beam 84 is preferably connected to the B-pillars 86, 88 (later referenced as "a first side panel" and "a second side panel") of the vehicle 40. In addition to enabling storage of the rear seat assembly, the cross-car beam 84 connected to the B-pillars 86, 88 of the vehicle 40 can provide increased vehicle structure improving torsional and other modal bending performance of the vehicle body, as well as potentially improving side impact performance of the vehicle. As shown in FIG. 7, the front riser 90 for the front seat assembly 54 is preferably a single generally centrally located support extending from the front portion 92 of the front seat bottom 52 to the floor 38 of the vehicle 40.

Figure 8:
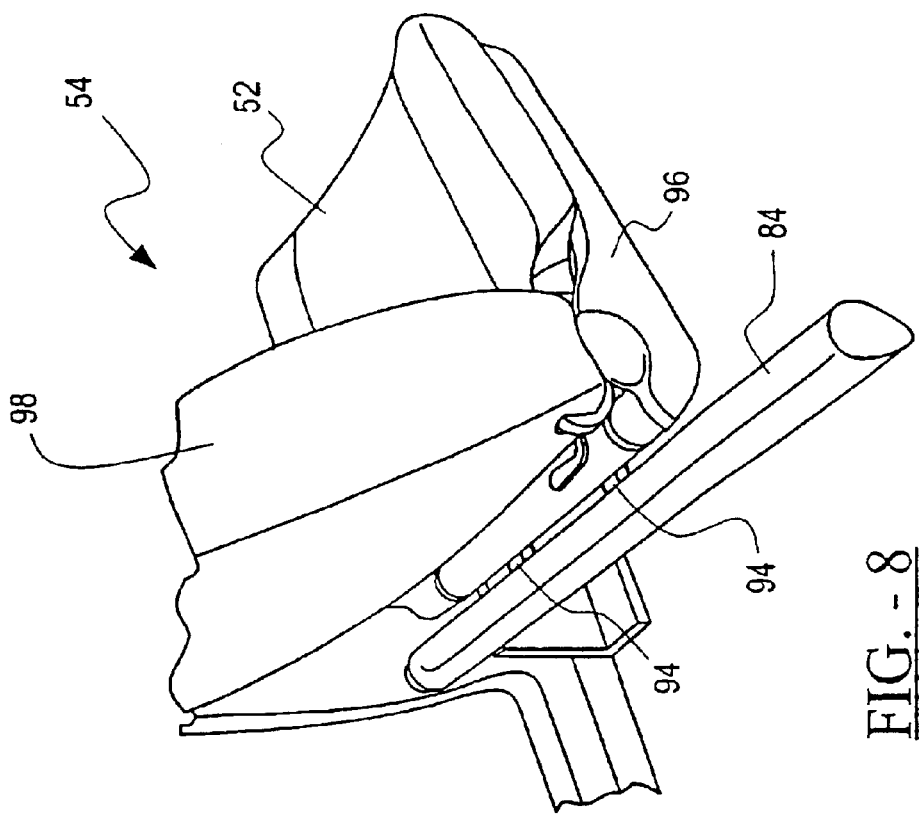
FIG. 8 is a perspective view of the adjustment device, according to the preferred embodiment of the invention.

As shown in FIG. 8, if fore and aft adjustment of the front seat bottom 52 is desirable, the front seat assembly 54 can be mounted to fore and aft adjustment mechanisms 94 which are in turn mounted to the cross-car beam 84 and the front riser by way of a supporting platform 96. The fore and aft adjustment mechanisms 94 can be power mechanisms or manual mechanisms depending upon the particular application. Further, the seat bottom angle can be adjusted relative to the supporting platform 96 by conventional systems known in the art. In the preferred embodiment, the front seat back 98 to front seat bottom 52 angle can be adjusted by a recline mechanism and preferably the front passenger side seat assembly 100 (shown in FIG. 6) can be folded to a forward, generally horizontal position, thereby providing improved storage of long items within the interior of the vehicle 40 or for providing a work surface incorporating a fixed or removable seat back utility module.

If attaching cross-car beam to the B-pillar structure of the vehicle is not desired, the crosscar beam can be supported by attachments extending to the floor of the vehicle, the attachments being laterally displaced beyond the width of the rear seat bottom so as not to interfere with the storage of the rear seat assembly.

Further, in conjunction with the front passenger side seat assembly folding to a generally horizontal position, the rear seat assembly can incorporate a release mechanism which allows the rear seat back to fold to a generally horizontal position. If, as in the preferred embodiment, the forty percent portion of the rear seat back is folded to a horizontal position and the front passenger side seat assembly is folded to a horizontal position, items can be stored within the interior of the vehicle which extend from the rearward surface of the instrument panel to the rear most surface in the cargo storage compartment.

Figure 9:
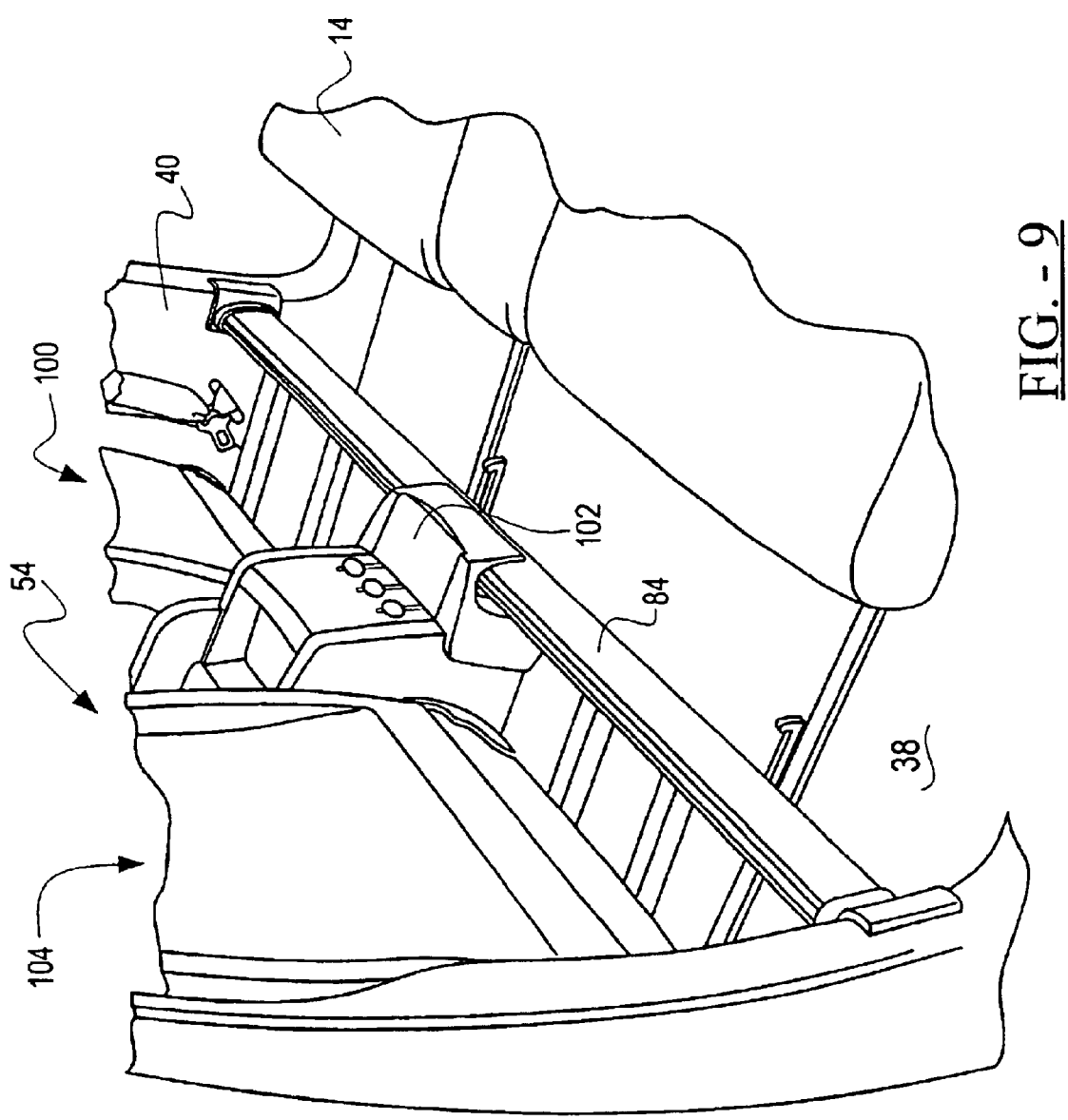
FIG. 9 is a perspective view of the center console, according to an alternative embodiment of the invention.

As shown in FIG. 9, the front seat assembly 54 of an alternative embodiment preferably includes a center console 102 located between the front driver side seat assembly 104 and the front passenger side seat assembly 100. Like the front seat assembly 54, the center console 102 is connected to the crosscar beam 84 at a height above the floor 38 of the vehicle 40 sufficient to allow the rear seat bottom 14 to slide below the center console 102. The center console 102 may include cargo compartments, cupholders, cargo trays, or any other suitable device.

We claim:

1. A seating assembly for a vehicle including a front seat assembly having a front seat back and a front seat bottom, the front seat bottom including a front portion and a rear portion, a rear seat assembly having a rear seat back and a rear seat bottom, and a track member connectable to a floor portion of the vehicle, the seating assembly comprising an articulation mechanism pivotally coupled to the rear seat bottom and slidably coupled to the track member, a support member connected to the front seat bottom and connectable to the vehicle, the support member supporting the rear portion of the front seat bottom from the vehicle to provide a storage space beneath the front seat bottom, and the rear seat bottom configured to pivotally move on the articulation mechanism and to slidably move on the track member between a use position and a stored position where the rear seat bottom is within the storage space and the rear seat back is disposed adjacent to the front seat back.

2. The seating assembly of claim 1 wherein said support member is connectable to a first side panel of the vehicle, and said support member extends from said side panel to said front seat bottom.

3. The seating assembly of claim 2 further comprising a second front seat bottom, and wherein said support member is connected to said second front seat bottom.

4. The seating assembly of claim 3 wherein said support member is connectable to a second side panel of the vehicle, and said support member extends from the first side panel to the second side panel.

5. The seating assembly of claim 2 further comprising a center console, and wherein said support member is connected to said center console.

6. The seating assembly of claim 1 further comprising a front riser connected to said front portion of said front seat bottom and connectable to the vehicle, and wherein said support member is connected to said rear portion of said front seat bottom.

7. The seating assembly of claim 6 wherein said front seat bottom includes an adjustment mechanism connected to said front riser and to said support member, wherein said adjustment mechanism allows horizontal movement of said front seat bottom.

8. The seating assembly of claim 1 further comprising a front seat back connected to said front seat bottom.

9. A rear seat assembly adapted for storage in cooperation with a front seat assembly having a front seat bottom and a front seat back in a vehicle, the rear seat assembly having a rear seat bottom connectable to the vehicle for movement between a use position and an intermediate position, the rear seat assembly comprising an articulation mechanism connectable to the rear seat bottom and to the vehicle and including a forward lift arm and a rearward lift arm that cooperate with the rear seat bottom and the vehicle as a four bar linkage to allow vertical and horizontal pivoting movement of the rear seat bottom between the use position and the intermediate position, a biasing device connectable to the forward lift arm and the rearward lift arm, and a slide mechanism connectable to the articulation device and the vehicle, wherein the slide mechanism allows fore-and-aft horizontal movement of the rear seat bottom between the intermediate position and a stored position beneath the front seat bottom.

10. The rear seat assembly of claim 9 wherein said biasing device biases said rear seat bottom out of the use position.

11. The rear seat assembly of claim 10 wherein said biasing device also biases said rear seat bottom out of the intermediate position.

12. The rear seat assembly of claim 11 further comprising a first latching device connected to said rear seat bottom and selectively engageable with the vehicle to hold said rear seat bottom in the use position.

13. The rear seat assembly of claim 12 further comprising a second latching device connected to said rear seat bottom and selectively engageable with said forward lift arm to hold said rear seat bottom among the intermediate position and the stored position; and a release handle connected to said first latching device and to said second latching device to simultaneously actuate said first latching device and said second latching device.

14. The rear seat assembly of claim 9 further comprising a third latching device connected to said slide mechanism having a first hook extending in a forward direction and a second hook extending in a rearward direction, wherein said first hook is selectively engageable with the vehicle to hold said rear seat bottom in the stored position, and said second hook is selectively engageable with the vehicle to hold said rear seat bottom among the intermediate position and the use position.

15. The rear seat assembly of claim 9 further comprising a rear seat back connected to said rear seat bottom and connectable to the vehicle for movement between the use position and the stored position such that, when said rear seat back is moved from the use position to the stored position, said rear seat back abuts the front seat back of the front seat assembly.

16. A front seat assembly and a rear seat assembly for a vehicle including a front seat bottom having a front portion and a rear portion, a rear seat bottom connectable to the vehicle for movement between a use position and an intermediate position, the front seat assembly and the rear seat assembly comprising an articulation mechanism connectable to the rear seat bottom and to the vehicle and including a forward lift arm and a rearward lift arm that cooperate with the rear seat bottom and the vehicle as a four bar linkage to allow vertical and horizontal pivoting movement of the rear seat bottom through the use position and the intermediate position, a biasing device connectable to the forward lift arm and the rearward lift arm, a support member connected to the front seat bottom and connectable to the vehicle, the support member supporting the rear portion of the front seat bottom from the vehicle to provide a stored position beneath the front seat bottom, and a slide mechanism connectable to the articulation mechanism and the vehicle, wherein the slide mechanism allows fore-and-aft horizontal movement of the rear seat bottom through the intermediate position and the stored position.

17. The front seat assembly and the rear seat assembly of claim 16 wherein said support member is connectable to a first side panel of the vehicle, and said support member extends from said side panel to said front seat bottom.

18. The front seat assembly and the rear seat assembly of claim 17 further comprising a second front seat bottom, and wherein said support member is connected to said second front seat bottom.

19. The front seat assembly and the rear seat assembly of claim 18 wherein said support member is connectable to a second side panel of the vehicle, and said support member extends from the first side panel to the second side panel.

20. The front seat assembly and the rear seat assembly of claim 17 further comprising a center console, and wherein said support member is connected to said center console.

21. The front seat assembly and the rear seat assembly of claim 16 wherein the front seat assembly is adjustable fore-and-aft on the support member when the rear seat bottom is in the use position or the stored position.

* * * * *